US011897691B2

(12) United States Patent
Clute

(10) Patent No.: US 11,897,691 B2
(45) Date of Patent: Feb. 13, 2024

(54) REDUCED ASH PLUME BUCKET

(71) Applicant: Stephen Clute, Cuba, NY (US)

(72) Inventor: Stephen Clute, Cuba, NY (US)

( * ) Notice: Subject to any disclaimer, the term of this patent is extended or adjusted under 35 U.S.C. 154(b) by 501 days.

(21) Appl. No.: 17/194,216

(22) Filed: Mar. 6, 2021

(65) Prior Publication Data

US 2022/0281680 A1 Sep. 8, 2022

(51) Int. Cl.
*B65F 1/10* (2006.01)
*B65F 1/14* (2006.01)

(52) U.S. Cl.
CPC .............. *B65F 1/10* (2013.01); *B65F 1/1468* (2013.01); *B65F 2240/104* (2013.01)

(58) Field of Classification Search
CPC .... B65F 1/10; B65F 1/1468; B65F 2240/104; B65F 2240/136
USPC ........................................................... 232/44
See application file for complete search history.

(56) References Cited

U.S. PATENT DOCUMENTS 1,234,992 A * 7/1917 Winters .................... B65F 7/00 422/5
3,658,241 A * 4/1972 Pistocchi .................. F41A 9/60 232/1 R
4,181,250 A * 1/1980 Withrow ............ A47G 29/1205 232/1 C
4,363,417 A * 12/1982 Rhoades ................... B65F 1/10 232/38
4,387,847 A 6/1983 Downey
4,406,395 A * 9/1983 Scoggins ................... F23J 1/04 220/2
4,497,308 A * 2/1985 Johnson ...................... F23J 1/04 110/165 R
4,704,764 A * 11/1987 Metelko, Jr. .............. B65F 1/10 15/301
4,943,002 A 7/1990 Fraher
5,772,112 A * 6/1998 Bulcroft ................ B65F 1/0093 232/44
9,150,354 B1 * 10/2015 Gischel ................. B65F 1/1473
2005/0155975 A1 7/2005 Belot

* cited by examiner

*Primary Examiner* — William L Miller
(74) *Attorney, Agent, or Firm* — Jong Patent Firm; Cheng Ning Jong; Tracy P. Jong

(57) ABSTRACT

An ash bucket including a container including a closable top opening and a side wall; a side opening disposed on the side wall; and a side cover configured to be hinged at a minimum height at a level of a top edge of the side opening, wherein the side cover is configured to be selectively covering the side opening, wherein upon disposal of a material through the side opening in the container, the side opening is closed with the side cover which suppresses airborne particles of the material to keep as much of the material within the container.

19 Claims, 3 Drawing Sheets

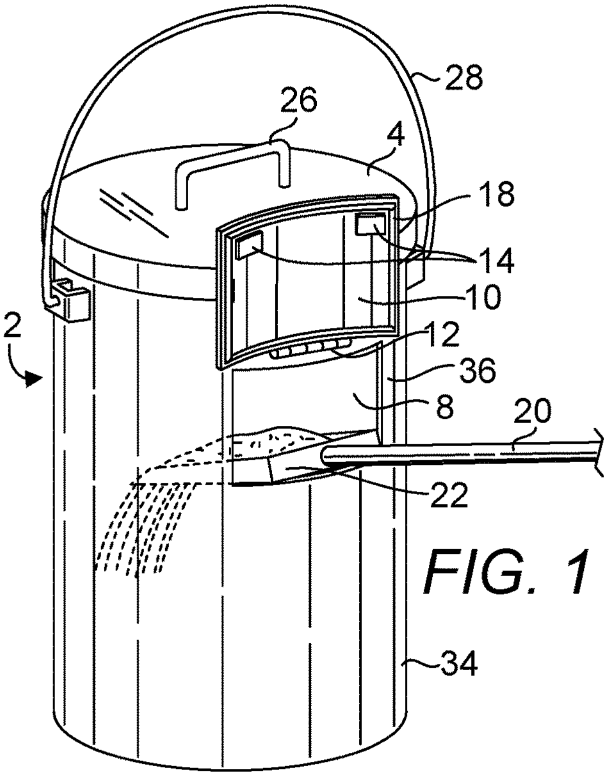
FIG. 1
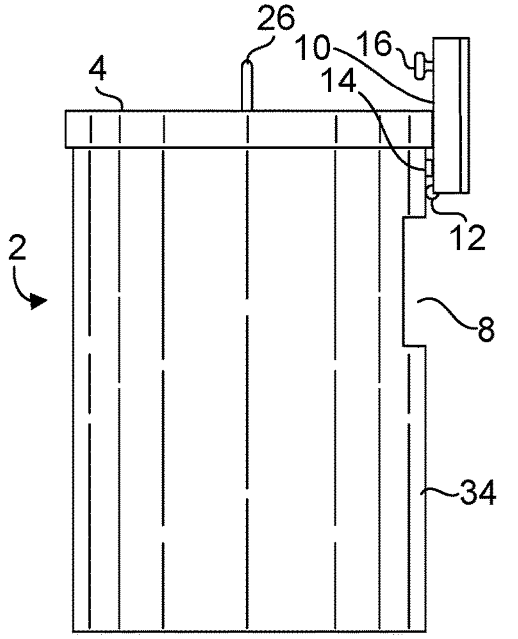
FIG. 3
FIG. 2
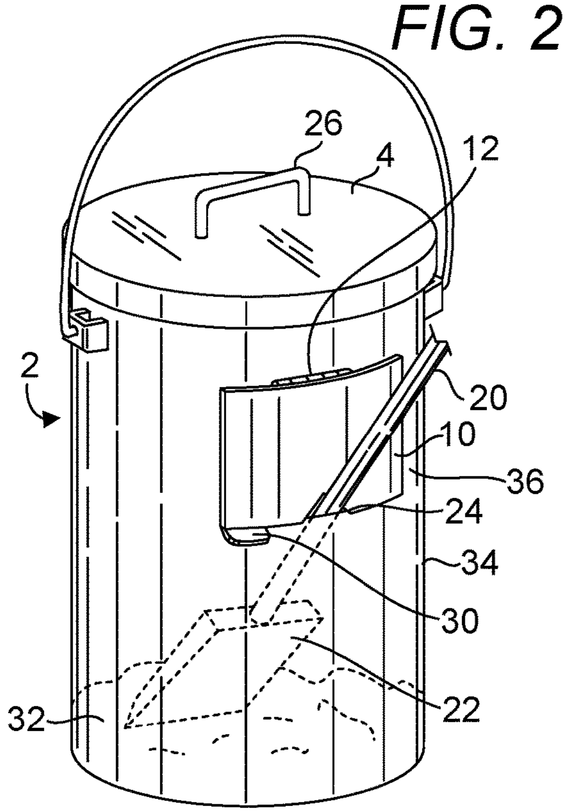
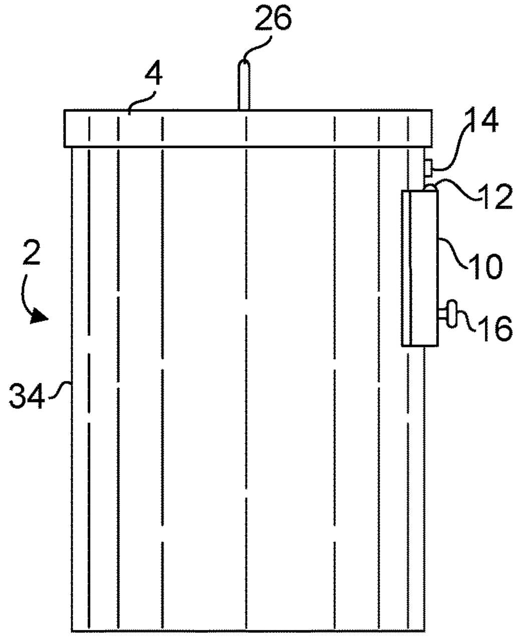
FIG. 4

FIG. 5
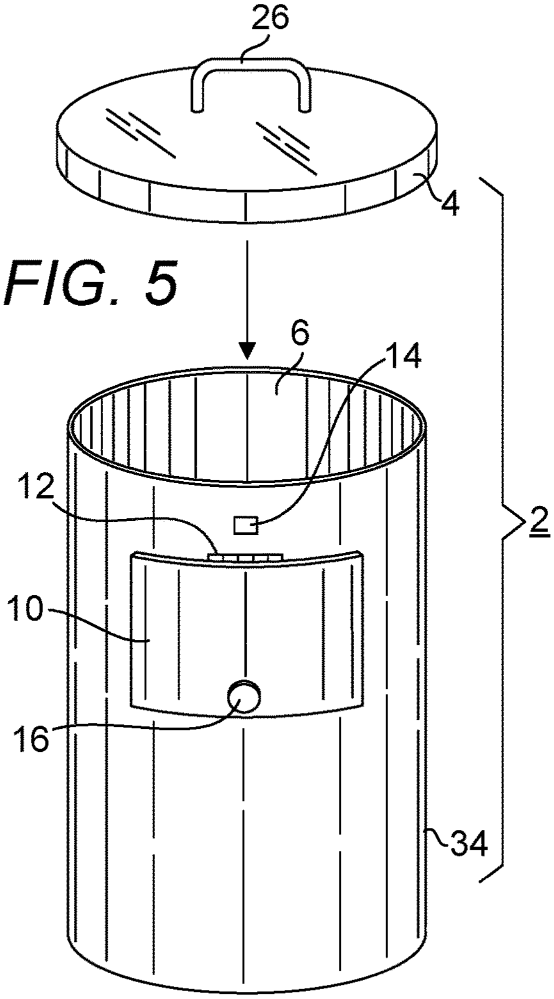
FIG. 6
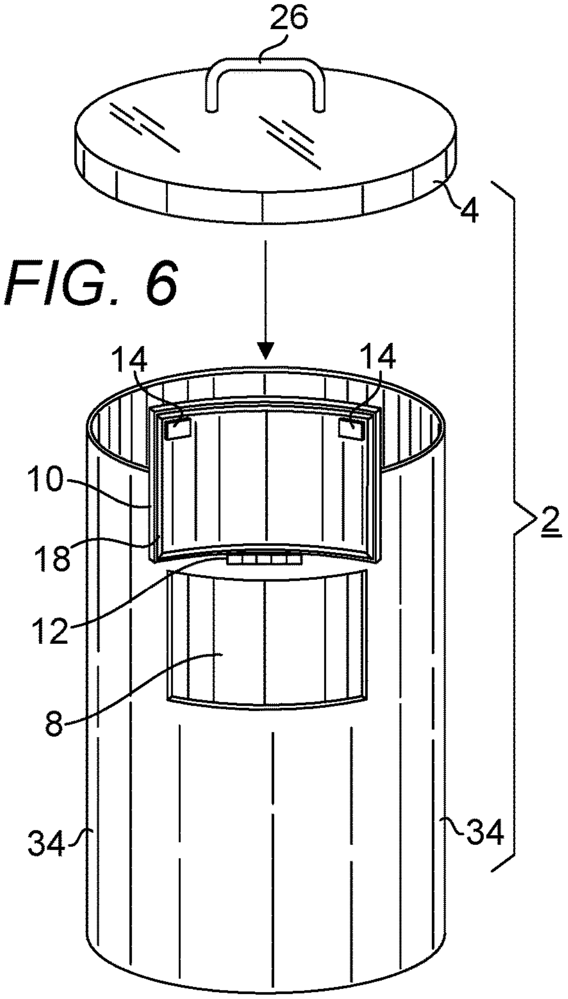
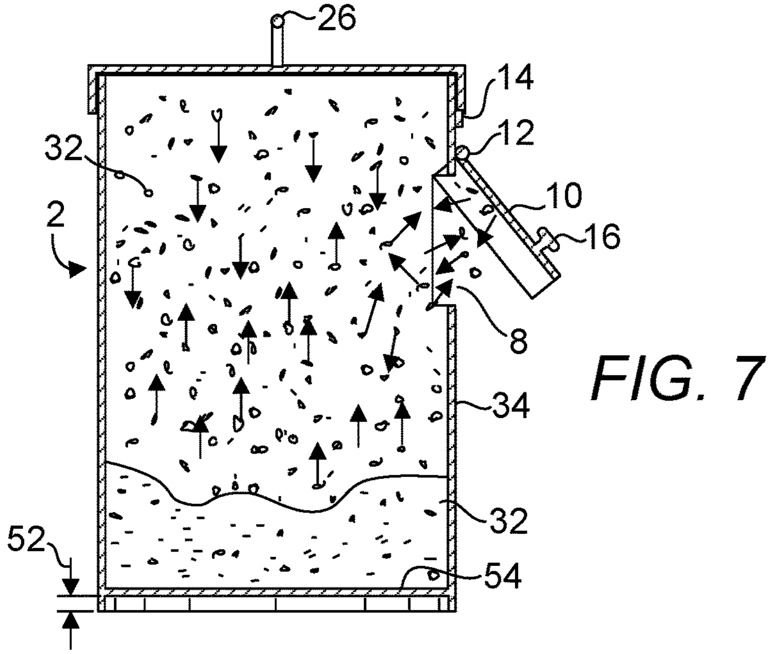
FIG. 7

REDUCED ASH PLUME BUCKET

BACKGROUND OF THE INVENTION

1. The Field of the Invention

The present invention relates to an ash bucket. More specifically, the present invention is directed to a portable ash bucket capable of reducing ash plumes generated from an act of disposing ash therein and/or capable of minimizing the escape of ash plumes generated from an act of disposing ash therein.

2. Background Art

As wood is relatively abundant in certain parts of the country and is generally considered a renewable material, wood burning stoves and fireplaces continue to be used in many households. Further, due to the high cost of modern energy production, e.g., from electricity, various gasses, e.g., natural gas, propane, methane, etc., increasing numbers of homeowners have turned to woodburning stoves and fireplaces for cooking and heating purposes. Many new homes, especially those in more remote locations where firewood is more abundant, are still being constructed with various types of woodburning devices which require periodic cleaning and ash removal. This chore often is messy. Due to the lightness of the wood stove and fireplace ash, it frequently proves difficult to shovel the ash into a conventional ash can without the escape of rising dust and soiling of the surrounding areas.

Heretofore, ash containers have been proposed with various types of entry openings for the purpose of preventing dust and ashes from escaping into the environment of the room after it is deposited into the container. These prior devices often have been ineffective, e.g., with barrierless entry openings, and complicated, e.g., with various compartments or chambers to trap or receive loads of ash, unsightly, and cumbersome to use, e.g., to clear of their contents or to receive loads of ash and yet still do not effectively suppress the escape of ash plume.

U.S. Pat. No. 4,943,002 to Fraher (Hereinafter Fraher) discloses an ash container that includes a receptacle having a bottom wall and a side wall defining a top opening, a removeable cover for closing the open top of the receptacle, and an entrance collar extending outwardly from one side of the side wall intermediate the bottom wall and the top of the receptacle for defining an unencumbered entrance opening to the receptacle. The bottom wall and a lower uninterrupted portion of the side wall define an ash accumulation zone below the entrance opening for containing ash deposited into the receptacle through the entrance opening, and the cover and an upper uninterrupted portion of the side wall define a dust reflection and redirection zone above the entrance opening for confining and redirecting downwardly into the accumulation zone dust from ash deposited into the receptacle through the entrance opening. Although Fraher's bucket is also side-loaded via a side wall-disposed opening, it relies on a collar attached thereon to reduce the escape of dust and Fraher teaches against providing a door for the side-wall-disposed opening and it appears incapable in containing hot and active ash, especially ash with embers.

U.S. Pat. No. 4,387,847 of Downey (Hereinafter Downey) discloses an improved container for loading, storing and/or transporting materials, particularly particulate materials which give rise to airborne contaminants when they are handled. The container includes a container body having an opening on one sidewall thereof, deflection means arranged inside of the container for directing airborne contaminants disposed inside of the container away from the opening and a door member pivotally connected with the container. The door member is pivotal between a generally horizontal open position wherein the door member cooperates with the deflection means to direct airborne contaminants inside of the container away from the opening and to substantially separate the interior of the container from the opening and a closed position wherein the door member substantially closes the opening. Although Downey's bucket is also side-loaded via a side wall-disposed opening, it relies on a door flap hingedly mounted on the bottom-edge of the opening and baffles disposed inside the bucket to reduce the escape of dust. The capacity of Downey's bucket appears to be compromised by at least the door flap that extends far inside the bucket.

U.S. Pat. Pub. No. 20050155975 of Belot (Hereinafter Belot) discloses a container provided for disposal of particulate material which is readily airborne. The container operates in co-operation with a shovel having an elongate handle and a scoop supported at one end thereof. A scoop opening is formed in one of the walls of the container with a gate member spanning the opening so that the opening remains substantially closed as a scoop is withdrawn from the container therethrough. Access to the opening is provided by a slot which receives the handle of the shovel to permit the scoop to be inserted through the open top end of the container and the lid placed on the container before the contents of the shovel are dumped. Although Belot's bucket is also side-loaded, the periphery of its side opening is lined with bristles which may unnecessarily generate ash plumes and dust as the scoop is inserted via the opening to feed the bucket, thereby making the bristles an undesirable feature.

There exists a need for an uncomplicated ash bucket capable of reducing of ash plume generated while or after ash is being disposed therein.

SUMMARY OF THE INVENTION

In accordance with the present invention, there is provided an ash bucket including:

(a) a container including a closable top opening and a side wall;

(b) a side opening disposed on the side wall; and (c) a side cover configured to be hinged at a minimum height at a level of a top edge of the side opening, wherein the side cover is configured to be selectively covering the side opening, wherein upon disposal of a material through the side opening in the container, the side opening is closed with the side cover which suppresses airborne particles of the material to keep as much of the material within the container.

In one embodiment, the side cover further includes a cutout along a bottom edge of the side cover, the side cover configured for accommodating a handle of a shovel. In one embodiment, the cutout is shaped according to a right angle notch. In one embodiment, the cutout is shaped according to a rounded notch. In one embodiment, the cutout covers an area of about 0.5 to about 3 square inches. In one embodiment, the container further includes a magnetic latch configured to keep the side opening in a closed position by holding the side cover in a first position. In one embodiment, the container further includes a magnetic latch configured to keep the side opening in an open position by holding the side cover in a second position. In one embodiment, the ash bucket further includes a friction hinge, wherein the side cover is configured to be hinged with the friction hinge to keep the side opening in a closed position by holding the side cover in a first position and to keep the side opening in an open position by holding the side cover in a second position. In one embodiment, the bucket further includes a handgrip disposed to a side of the side cover. In one embodiment, the side cover includes a seal disposed on an inner periphery of the side cover.

An object of the present invention is to provide a passive and uncomplicated ash bucket capable of containing ash and reducing the escape of ash plume generated from disposing ash therein.

Another object of the present invention is to provide an ash bucket with a large holding volume given its external size.

Another object of the present invention is to provide an ash bucket having an ash holding space that is easy to clear while the escape of ash plume generated from disposing ash therein can be reduced.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 is a partially transparent top front perspective view of one embodiment of a present ash bucket, depicting a load of ash being added to the ash bucket.

FIG. 2 is a partially transparent top front perspective view of another embodiment of a present ash bucket, depicting a shovel being stored with the bucket after its load having been added to the ash bucket.

FIG. 3 is a side view of a present ash bucket with its side opening disposed in an open position.

FIG. 4 is a side view of a present ash bucket with its side opening disposed in a closed position.

FIG. 5 is top front view of a present ash bucket with its side opening disposed in a closed position.

FIG. 6 is top front view of a present ash bucket with its side opening disposed in an open position.

FIG. 7 is a side cross-sectional view of a present ash bucket, depicting a manner in which ash plume is being contained by the side cover after one or more loads of ash having been added to the ash bucket.

PARTS LIST

Figure 8:
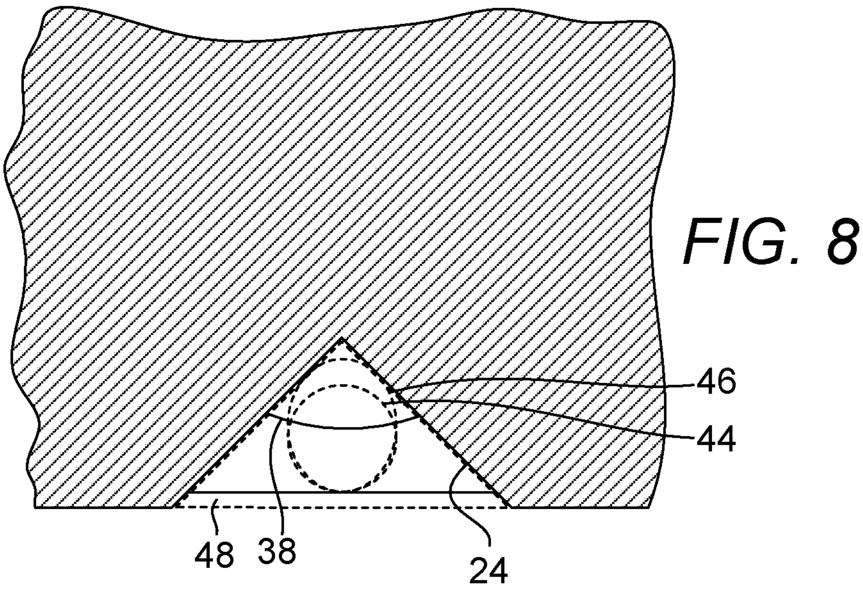
FIG. 8 is a partial close-up view of one embodiment of a cutout of the side opening.

2—bucket
4—lid
6—top opening
8—side opening
10—side cover
12—hinge
14—latch
16—knob
18—seal
20—shovel
22—scoop
24—cutout
26—lid handle
28—bucket handle
30—handgrip
32—ash
34—container
36—side wall
38—angle
40—width of cutout
42—arc
44—cross-sectional area of shovel
46—cross-sectional area of shovel
48—cutout area
50—depth of cutout
52—offset
54—floor of bucket

PARTICULAR ADVANTAGES OF THE INVENTION

When used properly, the present ash bucket suppresses the ash plume that rises after ash has been dumped in the bucket. Compared to ash buckets having side openings, with or without a cover for the side opening, the cover of the side opening of the present ash bucket is configured to be hingedly disposed above the opening, thereby allowing the cover to act against the rising ash plume, reducing the amount of ash plume ultimately escaping the bucket.

In one embodiment, the side cover further includes a cutout configured to accommodate the handle of a shovel disposed through the side opening the side cover is configured to block. The side opening therefore serves to receive a shovel that brings in ash while the side cover suppresses a rising ash plume while allowing a shovel's scoop to be seated in bucket.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

FIG. 1 is a partially transparent top front perspective view of one embodiment of a present ash bucket 2, depicting a load of ash being added to the ash bucket 2. FIG. 2 is a partially transparent top front perspective view of another embodiment of a present ash bucket 2, depicting a shovel being stored with the bucket 2 after its load having been added to the ash bucket 2.

FIG. 3 is a side view of a present ash bucket 2 with its side opening 8 disposed in an open position. FIG. 4 is a side view of a present ash bucket 2 with its side opening 8 disposed in a closed position. FIG. 5 is top front view of a present ash bucket with its side opening disposed in a closed position. FIG. 6 is top front view of a present ash bucket with its side opening disposed in an open position. The ash bucket 2 includes a container 34, a side opening 8 and a side cover 10. The container 34 includes a closable top opening 6 and a side wall 36. A lid 4 is provided to close the top opening 6 normally to prevent escape of ash plume through the top opening 6. A lid handle 26 is provided to make handling of the lid 4 easier. The side opening 8 is disposed on the side wall 36 to facilitate the disposed of ash through the side wall 36 and avoid the need for disposing ash through the top opening 6. The side cover 10 is preferably hinged at a height at or higher than the top edge of the side opening 8 as long as the cover 10 is capable of reducing escape of a rising ash plume, i.e., the cover is rotated in a downward direction to both trap and suppress a rising ash plume in keeping as much ash in the bucket 2 as possible. If necessary, the top opening 6 provides another means for receiving ash although the side opening 8 is much more preferable. The top opening 6 is preferably used for clearing the contents of the container 34 and the container 34 can be emptied without dirtying the outer surfaces of the container 34. This is done by tipping the container 34 on its side, ultimately positioning the container 34 upside down in a swift manner. The container 34 is then withdrawn quickly from its contents that are now disposed on the ground upon which the container 34 is disposed. Referring to FIG. 5, the floor 54 of the bucket 2 upon which ash is disposed, is preferably disposed at an offset 52 of at least about 1 inch as compared to the side wall 36 of the bucket 2 to prevent unnecessary heating, e.g., due to embers, of the floor or platform upon which the bucket 2 is disposed.

Referring to FIG. 1, in disposing of a load of ash with a shovel 20, the side cover 10 is flipped upwardly and held in an open position with a magnetic latch 14, If the side cover 10 is constructed from a ferromagnetic material, no complementary magnetic material is required to be disposed on the side cover 10 to keep the side cover 10 secured in the open position. A knob 16 is secured to an outer surface of the side cover 10 to provide a grasping point for the side cover 10. Any shovel 20 sized in a manner such that its scoop 22 fits through the side opening 8 can be used although some clearance should be available to ensure that the act of inserting and dumping a load of ash with a shovel can be performed swiftly without requiring unduly accuracy in aiming the shovel with respect to the side opening 8. Upon unloading ash into the container 34, the shovel 20 can be withdrawn quickly before the side cover 10 is detached from the magnetic latch 14 by the user quickly such that the side cover 10 can rotate about a hinge 12 at which the sider cover 10 is hingedly attached to the container 34 due to its own weight to close the side opening 8. In one embodiment, two magnetic latches 14 are provided to secure the side cover 10 tightly against the side wall 36 of the container 34. Again, if the container is constructed from a ferromagnetic material, no additional magnetic latches are required to be secured to the container 34 to interact with the magnetic latches 14 of the side cover 10. In the embodiment shown in FIG. 1, a seal 18 is disposed on an inner periphery of the side cover 10 to both soften the closure of the side cover 10 against the side wall 36 and also to reduce escape of an ash plume from the container 34. In one embodiment, at least one handle 28 is preferably attached to the container 34 to ease handling of the container 34.

Figure 9:
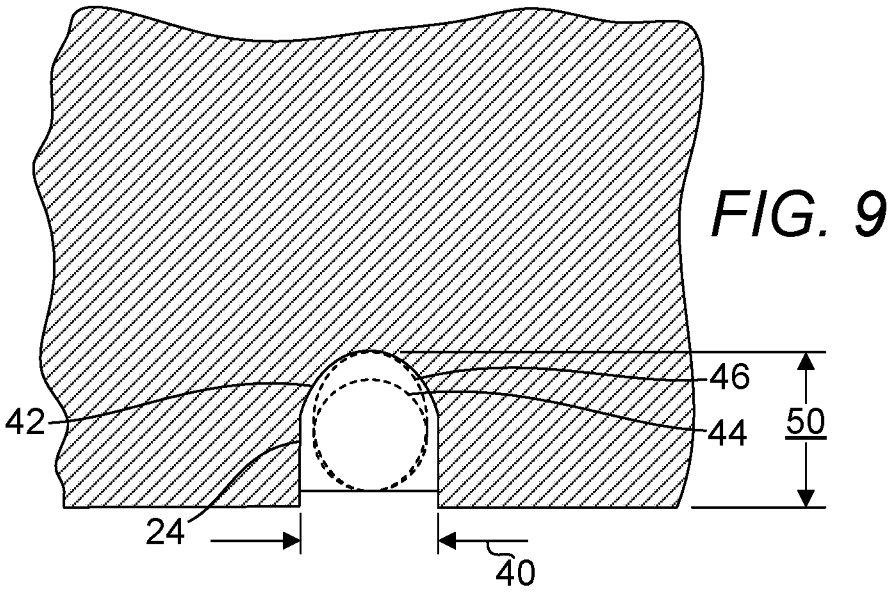
FIG. 9 is a partial close-up view of another embodiment of a cutout of the side opening.

Referring to FIG. 2, it shall be noted that, in this embodiment, the side cover 10 further includes a cutout 24 along a bottom edge of the side cover 10, where the side cover 10 is configured for accommodating a handle of a shovel. The cutout is preferably sized and shaped to provide sufficient clearance to accommodate a shovel 20 seated in an empty ash bucket. In other words, when the bucket is empty, the shovel 20 is disposed in an angle severe enough to require a larger opening than simply the cross-sectional profile of a handle of the shovel as illustrated elsewhere herein. In one embodiment, the cutout 24 is shaped according to a right angle notch as shown in FIG. 8 and a rounded notch as shown in FIG. 9. A handgrip 30 is preferably provided on a side of the cutout 24 such that a user of the bucket may hold the side cover 10 more readily and secured as, in this embodiment, it is impractical to dispose a knob 16 to facilitate grip of the side cover 10 as shown in FIG. 1. In one embodiment, no magnetic latches are required to keep the side cover 10 in the open or close position. In this embodiment, the hinge 12 is a friction hinge. The friction hinge provides a holding torque to maintain the hinge in any position including a position corresponding to the side cover being in an open position and a position corresponding to the side cover being in a closed position. In one embodiment, the friction hinge is configured such that a holding torque is present when the hinge is disposed in a position corresponding to the side cover being in an open position. However, to close the side opening, the holding torque which maintains the side cover in the open position simply needs to be overcome before the side cover can swing on its own weight to rest in the closed position. The ability to hold the side cover in an open position benefits the user not only during loading of ash in the bucket, but also in dumping the ash collected in the bucket.

FIG. 7 is a side cross-sectional view of a present ash bucket, depicting a manner in which ash plume is being contained by the side cover after one or more loads of ash 32 having been added to the ash bucket. It shall be noted that as the side cover 10 rotates downwardly, the rising plume of ash at or close to the opening 8 tends to be suppressed and if the side cover 10 is closed against the opening 8, most of the rising ash plume is contained within the container 34, removing the need to clean around the bucket. In cold climate, wood burning may be used not only to heat a space but also for cooking. Ash may also need to be removed while still hot, making the use of a top-hinged side cover even more crucial as the ash plume becomes even more active with increased temperature of the ash and embers mixed therein.

FIG. 8 is a partial close-up view of one embodiment of a cutout 24 of the side opening 8. Here, the cutout 24 is configured as right angle notch, i.e., angle 38 is at least about 90 degrees with the opening disposed at the bottom edge of the side cover 10, ready to accommodate the handle of a shovel 20 while the side cover 10 is disposed in a close position. In one embodiment, the total area 48 of the notch is about 0.5 to about 3 square inches. This is sufficient to accommodate most handles of shovels of various sizes and shapes while not being too large as to let a significant amount of rising ash plume to escape. It shall be noted that the cutout 24 is sufficiently large to accommodate not only a shovel handle while disposed significantly at right angle to the cutout 24 depicted as cross-sectional area 44 in FIG. 8 but also while disposed in a position with the handle represented by the cross-sectional area 46. FIG. 9 is a partial close-up view of another embodiment of a cutout 24 of the side opening 8. The width 40 of the cutout 24 preferably measures about 1 to about 1.5 inches while the depth 50 of the cutout 24 preferably measures no less than about 2 inches to accommodate both only a shovel handle while disposed significantly at right angle to the cutout 24 depicted as cross-sectional area 44 in FIG. 9 but also while disposed in a position with the handle represented by the cross-sectional area 46. The arc 42 disposed on the top edge of the cutout 24 preferably has a radius sufficiently large to accommodate a shovel 20 having a handle with a curved cross-sectional profile.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. An ash bucket comprising:

(a) a container comprising a closable top opening and a side wall;

(b) a side opening disposed on said side wall; and (c) a side cover configured to be hinged at a minimum height at a level of a top edge of said side opening, wherein said side cover comprises a seal disposed on an inner periphery of said side cover to soften a closure of said side cover against said side opening and said side cover is configured to be selectively covering said side opening, wherein upon disposal of a material through said side opening in said container, said side opening is closed with said side cover which suppresses airborne particles of said material to keep as much of the material within said container.

2. The ash bucket of claim 1, wherein said side cover further comprises a cutout along a bottom edge of said side cover, said side cover configured for accommodating a handle of a shovel.

3. The ash bucket of claim 2, wherein said cutout is shaped according to a notch selected from the group consisting of a right angle notch and a rounded notch.

4. The ash bucket of claim 2, wherein said cutout covers an area of about 0.5 to about 3 square inches.

5. The ash bucket of claim 1, further comprising a magnetic latch configured to keep said side opening in a closed position by holding said side cover in a first position.

6. The ash bucket of claim 1, further comprising a magnetic latch configured to keep said side opening in an open position by holding said side cover in a second position.

7. The ash bucket of claim 1, further comprising a friction hinge, wherein said side cover is configured to be hinged with said friction hinge to keep said side opening in a closed position by holding said side cover in a first position or to keep said side opening in an open position by holding said side cover in a second position.

8. The ash bucket of claim 1, further comprising a handgrip disposed to a side of said side cover.

9. The ash bucket of claim 1, further comprising a floor disposed at an offset from a bottom edge of said side wall.

10. The ash bucket of claim 9, wherein said offset is about 1 inch.

11. An ash bucket comprising:

(a) a container comprising a closable top opening and a side wall;

(b) a side opening disposed on said side wall; and (c) a side cover comprises a cutout along a bottom edge of said side cover, said cutout configured for accommodating a handle of a shovel, wherein said side cover is configured to be hinged at a minimum height at a level of a top edge of said side opening, wherein said side cover is configured to be selectively covering said side opening, wherein upon disposal of a material through said side opening in said container, said side opening is closed with said side cover which suppresses airborne particles of said material to keep as much of the material within said container.

12. The ash bucket of claim 11, wherein said cutout is shaped according to a notch selected from the group consisting of a right angle notch and a rounded notch.

13. The ash bucket of claim 11, wherein said cutout covers an area about 0.5 to about 3 square inches.

14. The ash bucket of claim 11, further comprising a magnetic latch configured to keep said side opening in a closed position by holding said side cover in a first position.

15. The ash bucket of claim 11, further comprising a magnetic latch configured to keep said side opening in an open position by holding said side cover in a second position.

16. The ash bucket of claim 11, further comprising a friction hinge, wherein said side cover is configured to be hinged with said friction hinge to keep said side opening in a closed position by holding said side cover in a first position or to keep said side opening in an open position by holding said side cover in a second position.

17. The ash bucket of claim 11, further comprising a handgrip disposed to a side of said side cover.

18. The ash bucket of claim 11, further comprising a floor disposed at an offset from a bottom edge of said side wall.

19. The ash bucket of claim 11, wherein said side cover comprises a seal disposed on an inner periphery of said side cover.

* * * * *